US011117541B2

(12) United States Patent
Lesnik et al.

(10) Patent No.: US 11,117,541 B2
(45) Date of Patent: Sep. 14, 2021

(54) AIRBAG ARRANGEMENT AND METHOD FOR MANUFACTURING THE SAME

(71) Applicant: International Automotive Components Group GmbH, Duesseldorf (DE)

(72) Inventors: Siegfried Lesnik, Toenisvorst (DE); Michael Loch, Freising (DE)

(73) Assignee: INTERNATIONAL AUTOMOTIVE COMPONENTS GROUP GMBH, Düsseldorf (DE)

( * ) Notice: Subject to any disclaimer, the term of this patent is extended or adjusted under 35 U.S.C. 154(b) by 8 days.

(21) Appl. No.: 15/863,629

(22) Filed: Jan. 5, 2018

(65) Prior Publication Data

US 2018/0194319 A1 Jul. 12, 2018

(30) Foreign Application Priority Data

Jan. 10, 2017 (DE) ..................... 10 2017 100 330.4

(51) Int. Cl.
*B60R 21/215* (2011.01)
*B29C 45/14* (2006.01)
(Continued)

(52) U.S. Cl.
CPC ...... *B60R 21/215* (2013.01); *B29C 45/14786* (2013.01); *B60R 21/235* (2013.01); *B29C 45/0081* (2013.01); *B29C 2045/14901* (2013.01); *B29L 2031/3038* (2013.01); *B60R 2021/161* (2013.01);
(Continued)

(58) Field of Classification Search
CPC ................. B60R 21/215; B60R 21/235; B60R 2021/23557; B60R 2021/23523; B60R 2021/23509; B60R 2021/21537; B60R 2021/161; B29C 45/14786; B29C 45/0081; B29C 2045/14901; B29L 2031/3038
See application file for complete search history.

(56) References Cited

U.S. PATENT DOCUMENTS 5,901,976 A 5/1999 Kreuzer et al.
2004/0026009 A1* 2/2004 Ponthieu ............... B60R 21/205
156/73.1
(Continued)

FOREIGN PATENT DOCUMENTS

DE 102007053995 A1 5/2009
DE 102015001103 A1 8/2016
(Continued)

OTHER PUBLICATIONS

European Search Report and Written Opinion relating to corresponding EP Application No. 17209724, completed Feb. 1, 2018 and dated Feb. 12, 2018.

*Primary Examiner* — Frank B Vanaman
(74) *Attorney, Agent, or Firm* — Steven J. Grossman; Grossman, Tucker, Perreault & Pfleger PLLC

(57) ABSTRACT

An airbag arrangement comprising a flap, which closes a passage opening for an airbag, a hinge section along a side of the flap, an chute wall, which is connected to the flap via the hinge section; and a material web, which is partially arranged in the flap and partially in the chute wall, and transverses the hinge section, wherein the material web is molded into the chute wall and is anchored in the material of the chute wall.

20 Claims, 4 Drawing Sheets

(51) Int. Cl.
  *B60R 21/235* (2006.01)
  *B29L 31/30* (2006.01)
  *B29C 45/00* (2006.01)
  *B60R 21/16* (2006.01)

(52) U.S. Cl.
  CPC ............... *B60R 2021/21537* (2013.01); *B60R 2021/23509* (2013.01); *B60R 2021/23523* (2013.01); *B60R 2021/23557* (2013.01)

(56) References Cited

U.S. PATENT DOCUMENTS

| | | | |
|---|---|---|---|
| 2009/0026740 A1* | 1/2009 | Dorn | B60R 21/216 280/728.3 |
| 2012/0126514 A1 | 5/2012 | Choi | |
| 2014/0077479 A1* | 3/2014 | Kim | B29C 45/1671 280/728.3 |
| 2014/0375026 A1* | 12/2014 | Schupbach | B60R 21/215 280/728.3 |
| 2014/0375027 A1* | 12/2014 | Baudart | B60R 13/0256 280/728.3 |
| 2014/0375029 A1 | 12/2014 | Pauthier et al. | |
| 2015/0224954 A1* | 8/2015 | Evans | B60R 21/215 156/73.5 |
| 2016/0167612 A1* | 6/2016 | Svensson | B60R 21/215 280/728.3 |

FOREIGN PATENT DOCUMENTS

| | | |
|---|---|---|
| EP | 2193960 A1 | 6/2010 |
| EP | 3034361 A1 | 6/2016 |
| WO | 2008087014 A1 | 7/2008 |

\* cited by examiner

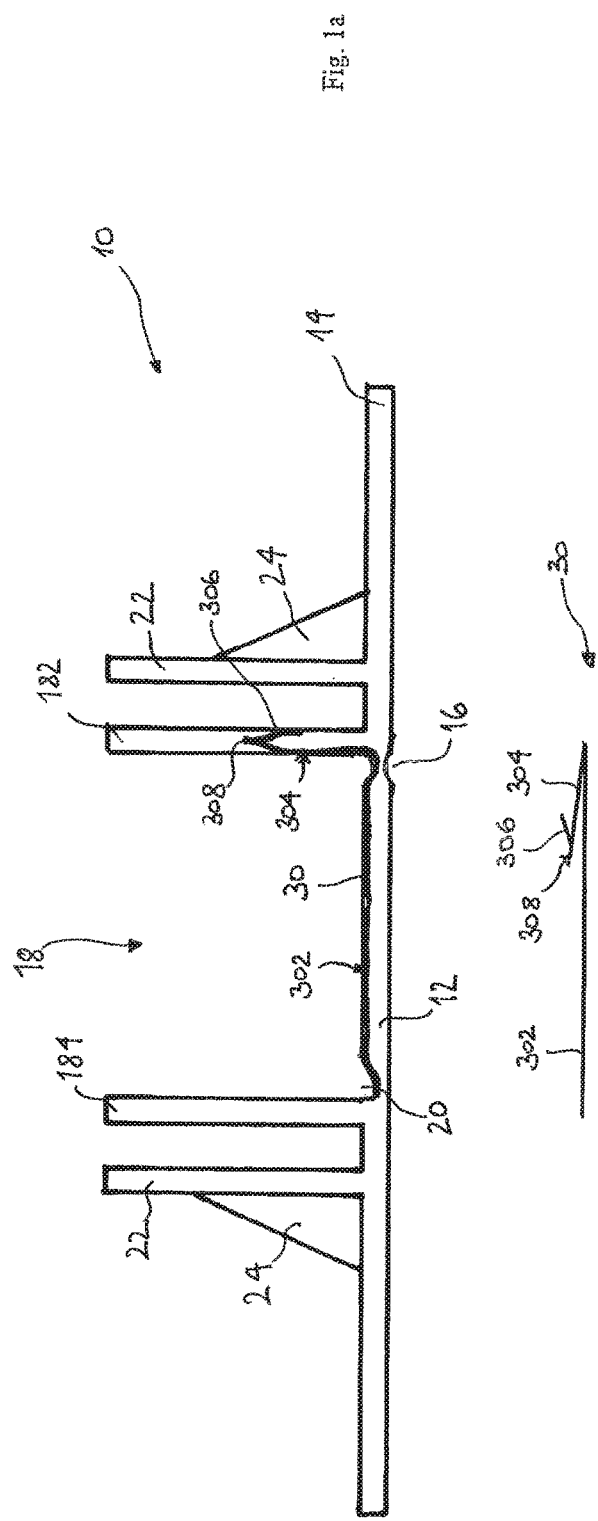
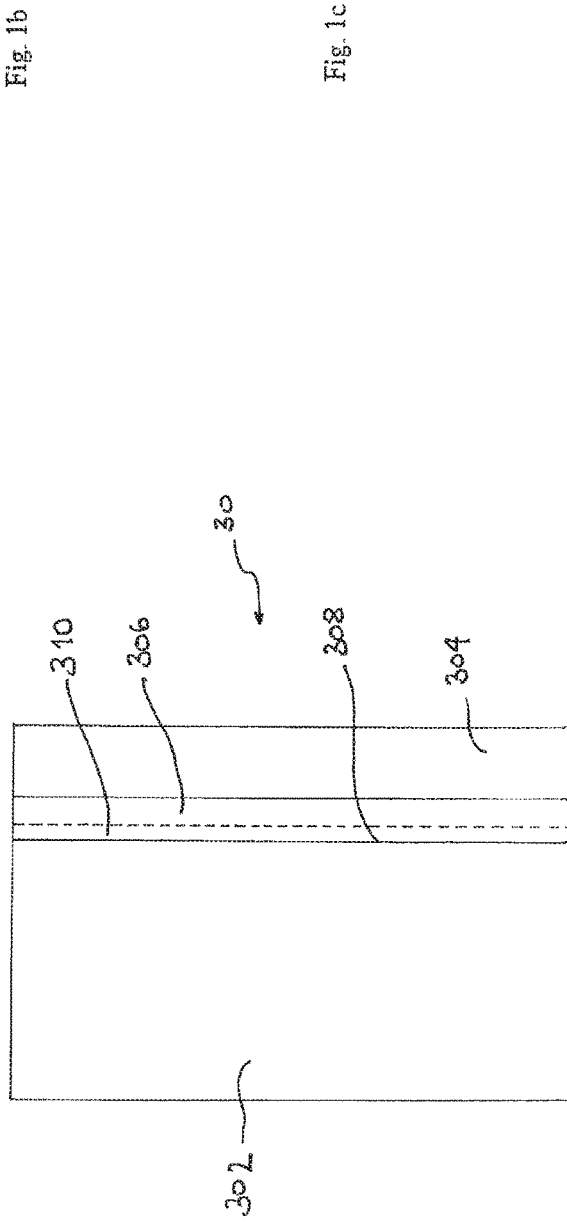

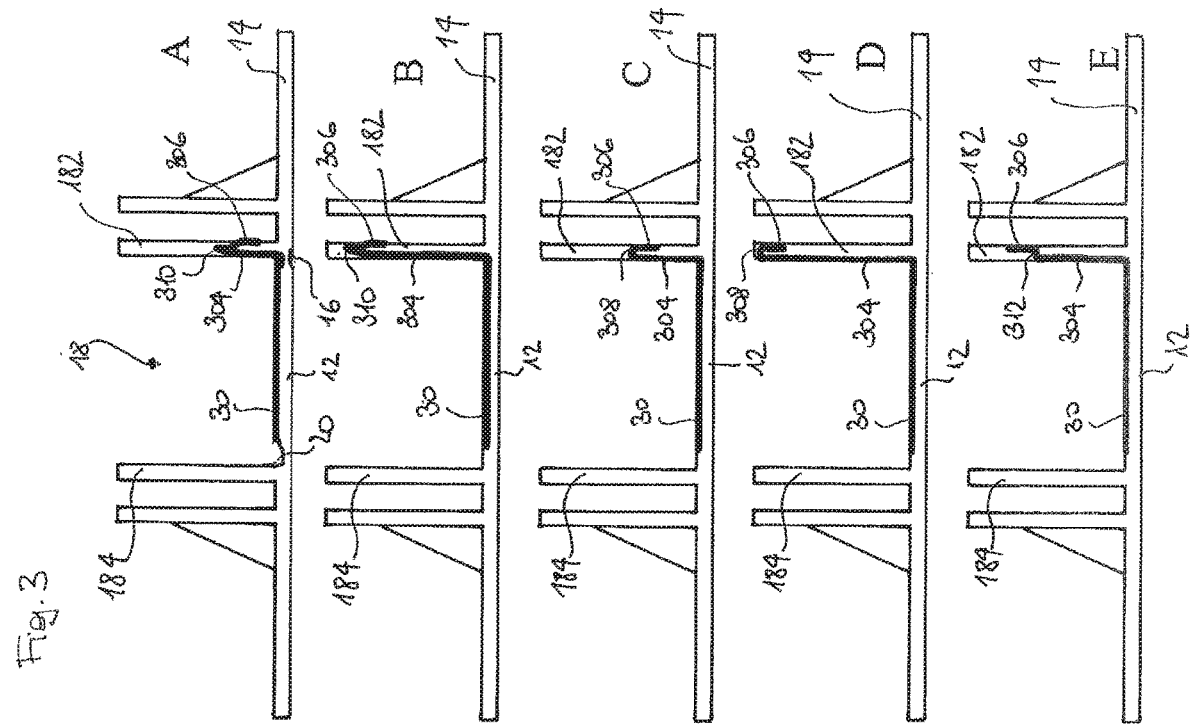
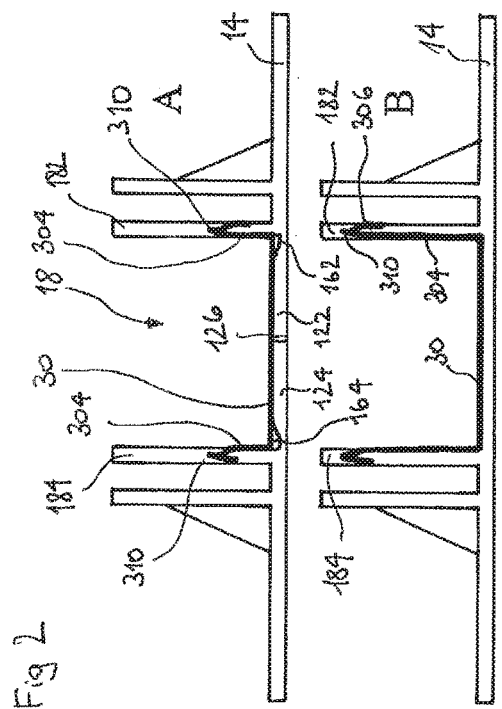

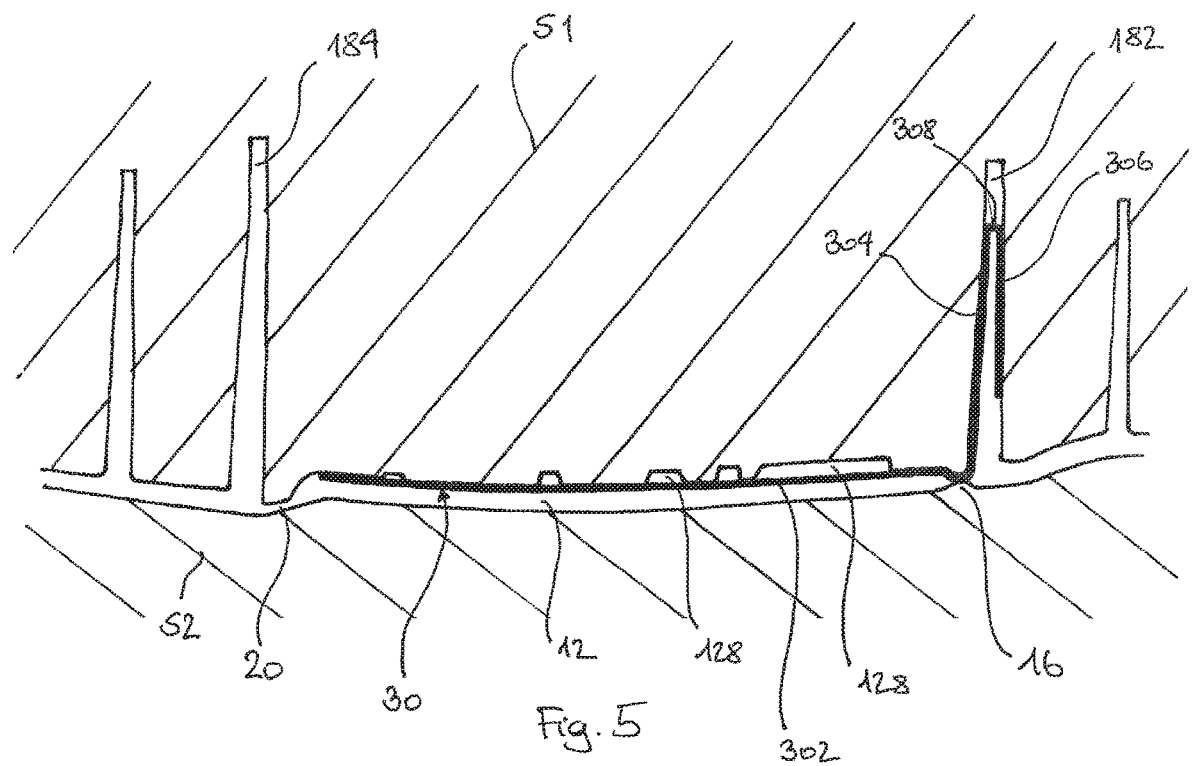

AIRBAG ARRANGEMENT AND METHOD FOR MANUFACTURING THE SAME

FIELD

The invention relates to an airbag arrangement and to a method for manufacturing the same.

BACKGROUND

An airbag arrangement for a motor vehicle comprises an airbag cover, which closes a passage opening for the airbag, and which can be integrated into a vehicle trim part, for example into the support of a dashboard. Such an airbag arrangement is described for example in DE 10 2007 053 995 A1. The airbag cover is integrated into an opening in the dashboard and is fastened to the dashboard by means of an arrestor strap. The dashboard and the airbag cover are manufactured by means of injection molding, whereby one end of the arrestor strap is embedded into the support of the dashboard during a first injection molding process, and the other end of the arrestor strap is subsequently embedded into the airbag cover in a second injection molding process, so as to connect the dashboard and the airbag cover to one another.

A similar method for manufacturing an airbag arrangement is described in EP 3 034 361 A1, wherein the airbag cover and the support of the dashboard are made of one piece and a hinge section is formed between them by means of a material weakening. A reinforcing net spans the airbag cover, the hinge area and an adjacent area of the support and is attached or molded to said airbag cover in a generally planar manner. The reinforcing net extends through a part of a reinforcing rib in an arc, so as to prevent that the reinforcing net is released from the surface of the airbag cover or of the support in response to the triggering of the airbag. An ejection chute is attached to the support below the airbag cover.

SUMMARY

It is an object of the invention to provide an airbag arrangement, which can be manufactured easily and the operation of which is safe. This object is solved by means of an airbag arrangement according to the present disclosure.

The airbag arrangement according to the invention comprises a flap component, hereinafter also only referred to as flap, which closes a passage opening for an airbag. A hinge section is arranged along one side of the flap, and an ejection chute component is connected to the flap via the hinge section. A material web is partially arranged in the flap and partially in the chute component, and transverses the hinge section. The material web is molded into the chute component and is anchored in the material of the chute component.

The chute component is a part of the chute, which is located below the flap and which controls the passage of the airbag, and can comprise a wall of the airbag chute, in particular a boundary wall, reinforcing wall, guide wall or positioning wall. The chute component extends at an angle relative to the plane, in which the flap is located, for example at an angle of 90° or approximately 90°. The flap, in turn, can be located in the plane of a support of an interior trim part, for example of a support of a dashboard, when the airbag arrangement is inserted into the interior trim part. The material web stabilizes the hinge section, controls the opening of the flap in response to the triggering of the airbag, and prevents that the flap is partially or completely released in response to triggering of the airbag.

In the described airbag arrangement, if the material web between the flap and the chute component extends at an angle of 90° or approximately 90°, there is the risk that, due to the very strong forces acting on the flap, the material web is pulled out of the chute component in response to the opening of the flap, even if the material web is molded into the chute component. This can lead to an uncontrolled opening or even detaching of the flap. According to the invention, this problem is solved in that the material web is anchored in the chute component.

For anchoring, the material web can be partially arranged on the inner side of the wall and partially on the outer side of the wall of the chute component, whereby the inner side of the wall faces the airbag chute and the outer side of the wall faces away from it. The material web can have an edgefolding, e.g., which is embedded into the chute component in such a way that the material web abuts on the inner side of the wall and on the outer side of the wall on both sides of the edgefolding. To produce and fix the edgefolding, the two layers of the material web can be connected to one another adjoining the edgefolding on both sides of the edgefolding.

The material web can be arranged inside the wall in such a way that the edgefolding comes to rest on a distal end of the wall or at a distance to the distal end of the wall of the airbag chute and is embedded into said wall. The material web should extend along the inner side of the wall to the edgefolding across a distance of at least 1 mm, but it can also abut on the inner side of the wall across a larger distance, for example across at least 2 mm, at least 3 mm, at least 4 mm, at least 5 mm, at least 10 mm, or at least 20 mm.

In another example, the material web is arranged on the inner side of the wall from the hinge section across a first distance, and on the outer side of the wall across a second distance, wherein the material web penetrates the wall between the first distance and the second distance. In this example, the first distance should also be at least 1 mm, but it can also be longer, for example at least 2 mm, at least 3 mm, at least 4 mm, at least 5 mm, at least 10 mm, or at least 20 mm.

Generally, U-shaped and H-shaped airbag flaps are known. In the U-shaped airbag flap, a hinge section is located along one side of the airbag flap, and a U-shaped weakening line or tear line defines the outline of the flap along the remaining sides of the airbag flap. Accordingly, the material web extends from the flap across the hinge section in the chute component. In the H-shaped airbag flap, two hinge sections are located along two opposite sides of the airbag flap, and an H-shaped weakening line or tear line defines the outline of a double flap along the remaining sides. The material web extends from the double flap across both hinge sections in opposite chute components and is embedded into the two opposite chute components and is anchored therein. The weakening line or tear line is thus located between the two hinge sections, so that the flap is divided into two flap halves, which can be pivoted open via the assigned hinge sections.

The wall or the walls of the chute components do not need to enclose an angle of exactly 90° with the flap, the angle can for example also be in the range of between 30° and 150° or in the range of between 45° and 135°, or can be approximately 90°.

The material web is preferably also molded into the flap.

In one example, the flap, the hinge section and the chute component are formed as an injection molded part.

The material web can comprise a net or a fabric. One example for a suitable material is described in DE 10 20150 01 103 A1, which is incorporated herein by reference. Other than a net or a fabric, the material web can also comprise a knitted fabric, a film, a metal layer or a combination thereof, wherein the material web can include natural and/or synthetic fibers. The material web can be capable of being expanded at least in a first direction, which extends perpendicular or approximately perpendicular to the hinge section.

The invention also provides a vehicle interior trim part comprising an airbag arrangement of the above-described type. The vehicle interior trim part can for example be a dashboard, an A column or B column lining, a door lining or part of a steering wheel lining.

The invention further provides a method for manufacturing an airbag arrangement of the type described above. The method uses a mold comprising a first mold shell and a second mold shell, which are designed in such a way that the flap, the hinge section and the chute component can be formed of one piece. The material web is placed into the mold in such a way that a first part of the material web comes to rest on a first surface section of the mold, which is configured to form a surface of the flap, which faces the airbag, a second part of the material web comes to rest on a second surface section of the mold, which is configured to form an adjoining surface of the chute component, and a third part of the material web comes to rest on a third surface section of the mold, which is configured to form an opposite surface of the chute component. After the mold is closed, plastic material is introduced, e.g. injected, into the closed mold, wherein the first, the second, and the third part of the material web are pressed against the first, the second, and the third surface section of the mold. This has the effect that the material web does not run in a straight line inside the chute component, but is deflected, so that it is anchored therein.

When the material web, which is placed into the mold, has an edgefolding between the second and the third part of the material web, the plastic material can penetrate into the edgefolding, when it expands in the mold, wherein the penetrating plastic material pushes the second and the third part of the material web apart and against the opposite surface sections of the mold. The edgefolding can be preformed and fixed prior to placing the material web into the mold.

FIGURES

The invention will be explained below in view of different examples with reference to the drawings FIG. 1a shows a schematic sectional view through an airbag arrangement according to one example;

FIG. 1b shows a schematic sectional view through a material web of the airbag arrangement according to one example;

FIG. 1c shows a top view onto the material web of FIG. 1b;

Figure 4:
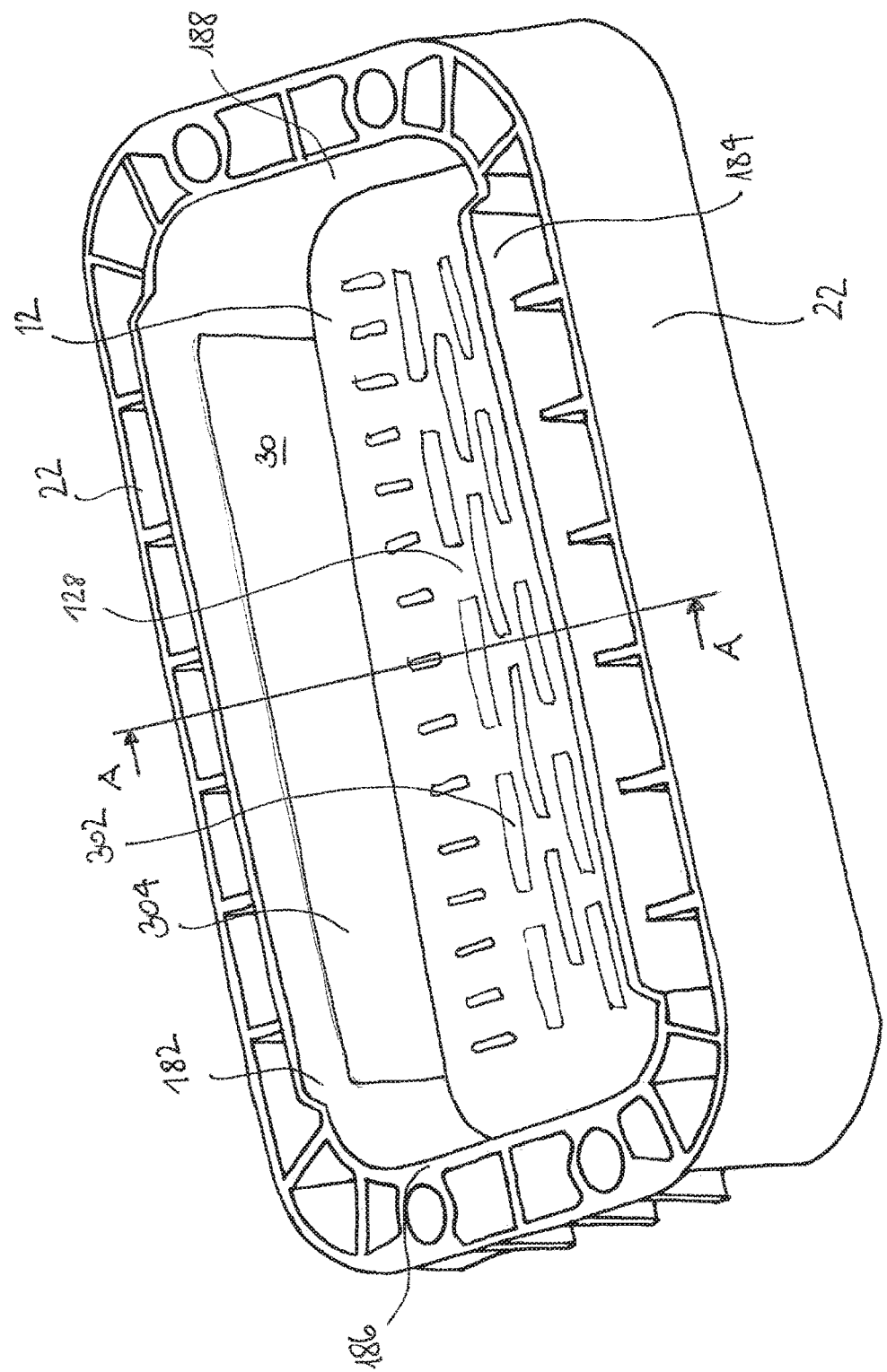

FIG. 2-A shows a schematic sectional view of a further example of an airbag arrangement;

FIG. 2-B shows a schematic sectional view of a further example of an airbag arrangement;

FIG. 2-C shows a schematic sectional view of a further example of an airbag arrangement;

FIG. 2-D shows a schematic sectional view of a further example of an airbag arrangement;

FIG. 2-E shows a schematic sectional view of a further example of an airbag arrangement;

FIG. 3-A shows a schematic sectional view of a further example of an airbag arrangement;

FIG. 3-B shows a schematic sectional view of a further example of an airbag arrangement;

FIG. 3-C shows a schematic sectional view of a further example of an airbag arrangement;

FIG. 3-D shows a schematic sectional view of a further example of an airbag arrangement;

FIG. 3-E shows a schematic sectional view of a further example of an airbag arrangement;

FIG. 4 shows a perspective view of a further example of an airbag arrangement; and FIG. 5 shows a sectional view through the airbag arrangement of FIG. 4, along line A-A.

DETAILED DESCRIPTION

FIG. 1a shows a schematic sectional view through an airbag arrangement 10 according to one example. The airbag arrangement comprises a flap 12, which closes a passage opening for an airbag (not shown). The flap 12 is located in a support 14, which can be connected for example to a dashboard or another interior trim part or interior lining part of a motor vehicle, when the airbag arrangement is inserted into the interior trim part. The flap 12 is connected to a part of an ejection chute 18 of the airbag arrangement via a hinge section 16. The chute 18 is illustrated schematically in FIG. 1 by means of two walls 182, 184. These walls 182, 184 can for example comprise a boundary wall, a reinforcing wall, a guide wall or a positioning wall. In the example, the flap 12 abuts on the wall 182, wherein the hinge section 16 is located on the boundary surface between the flap 12 and the wall 182. A weakening line or predetermined breaking line 20, along which the flap 12 can be released from the support 14, is embodied on the opposite edges of the flap 12, in order to pivot open via the hinge section 16, when the airbag is triggered. Further walls and reinforcing ribs of the chute are illustrated at 22 and 24.

In this as well as in the other figures, the airbag arrangement is illustrated in an orientation, in which the flap 12 points downwards and the chute 18 extends upwards from the flap 12. This corresponds to a view, in which the airbag arrangement is viewed from below or inside the interior trim part. Surfaces located on the inside are defined as surfaces, which face the chute 18, and surfaces located on the outside are defined as surfaces, which face away from the chute 18.

A material web 30 extends from the flap 12 across the hinge section 16 into the wall 182 of the chute. Close to the surfaces of the flap 12 and of the wall 182, which face the chute 18, the material web 30 is embedded therein. For example when forming the flap and the chute, the material web can be injected into these. In the example of FIG. 1, the material web 30 has an edgefolding, so that a part of the material web 30 abuts on the inner side of the wall and another part abuts on the outer side of the wall 182. The material web 30 is thus anchored in the wall 182.

FIGS. 1b and 1c show a sectional view and a top view onto the material web 30. For the manufacture of the airbag arrangement, the material web 30 can be folded ahead of time, so that it has a first section 302, which in the completed airbag arrangement comes to rest along the flap 12, a second section 304, which comes to rest along the inner side of the wall 182, and a third section 306, which comes to rest along the outer side of the wall 182. In the completed airbag arrangement, an angle of approximately 90° is formed between the first section 302 and the second section 304, when the wall 182 and the flap 3o enclose an angle of approximately 90°. However, the invention is not limited to a certain angle between the flap and the wall. An edgefolding 308, which can be fixed in a bend area 310, for example adhered, welded, sewn, riveted, stapled, or prefixed in a different way, is formed between the second section 304 and the third section 306. The edgefolding can also be unfixed in the bend area, thus be folded over without fixation.

The material web 30 follows the inner contour on the inner surface of the flap 12 and the wall 182, and is embedded therein in such a way that a thin material layer of the flap 12 and of the wall 182 surrounds the material web 30. Only the third section 306 of the material web is located on the surface of the wall 182, which faces the outside, wherein the material of the wall 182 has penetrated the edgefolding 308 between the second section 304 and the third section 306 of the material web 30 and thus fixes the material web 30 in the wall 182. Thanks to this fixation it can be prevented that the material web 30 is pulled out of the wall 182 in response to the triggering of the airbag and thus in response to the opening of the flap 12.

FIGS. 2A-2E and 3A-3E schematically show different alternatives of the airbag arrangement, which are identified with A to E. Reference is made accordingly to the individual views as FIGS. 2-A, 2-B etc. The views of FIGS. 2A-2E show airbag arrangements comprising an H-shaped flap, and the views of FIGS. 3A-3E show airbag arrangements comprising a U-shaped flap. In the U-shaped airbag flap, the hinge section is located along one side of the airbag flap, and the material web thus extends from the flap across the hinge section into the chute component. With respect to the hinge section, the flap has a predetermined breaking line, so that the flap can pivot open via the hinge section. In the H-shaped airbag flap, two hinge sections are located along two opposite sides of the airbag flap, and the material web accordingly extends from the flap across both hinge sections into opposite chute components and is embedded into the two opposite chute components and is anchored therein. In the example shown, in the center or approximately in the center between the two hinge sections, the flap and the material web of this H-shaped example have a predetermined breaking line, which separates the flap into two flap halves, so that these flap halves can pivot open via the assigned hinge sections. The predetermined breaking line can also be arranged in such a way that the flap is divided at a different ratio, e.g. 30:70 or 40:60.

FIG. 2-A shows an example of an H-shaped airbag flap comprising a material web 30 (illustrated by a thicker line), which has two opposite second sections 304, which extend along the inner sides of opposite walls 182, 184. On its opposite ends, the material web 30 in each case has an edgefolding, which is fixed in a bend area 310. The material web 30 extends from the inner side of the wall 182, via a first hinge section 162, the two flap halves 122, 124, and a second hinge section 164, to the inner side of the wall 184. The edgefolding of the material web 30 is arranged and fixed in the walls 182, 184 at a distance to the hinge sections 162, 164, wherein this distance should be at least 1 mm and can be between 1 mm and several centimeters, depending on the length of the walls 182, 184. The material web 30 is embedded into the flap halves 122, 124 and the walls 182, 184 and is located close to the inner sides thereof, which face the chute 18. The two flap halves 122, 124 are separated by a predetermined breaking line 126, wherein the predetermined breaking line can be formed by means of a material weakening, which extends through the material web 30. Via the hinge sections 162, 164, they are further connected to a support 14, which can be used for mounting the airbag arrangement to an interior trim part.

In a slightly different configuration, the chute with integrated flap part(s) and injected material web also can be attached to the support in a separate process step, e.g. by welding. The chute then is not integrated into the support, but forms an independent component, which is connected to the support or directly to an interior trim part. This variation is possible in all examples.

FIGS. 2-B to 2-E show modifications of the airbag arrangement of FIG. 2-A and are described below only insofar as they differ from FIG. 2-A. For the sake of clarity, not all components are provided with reference numerals. Unless otherwise specified below, the statements made above with reference to FIG. 2-A applies for the examples of FIGS. 2-B to 2-E. For example, the hinge areas 162, 164 and the predetermined breaking line 126 are only illustrated in the example of FIG. 2-A; however, they can also be provided in the examples of FIGS. 2-B to 2-E.

In the example of FIG. 2-B, the material web 30 extends across the entire inner side of the walls 182, 184, so that the edgefolding in each case comes to rest on the distal ends of the walls 184, 182. In this example, the bend area 310 is located on the end of the walls 182, 184, the third section 306 of the material web, however, is embedded into the material of the walls 182, 184 on the outer side thereof.

The example of FIG. 2-C is similar to the example of FIG. 2-A, but differs in that the material web 30 in each case does not have a prefixed bend area in the area of the edgefolding 308. In the area of the edgefolding 308, the material web 30 is folded from the second section 304 to the third section 306 in an arch or bend, and penetrates the walls 182, 184, so that the second section 304 comes to rest on the inner side, and the third section 306 comes to rest on the opposite outer side of the walls 182, 184.

The example of FIG. 2-D is similar to the example of 2-C, wherein the material web 30 extends to the distal ends of the walls 182, 184, and the edgefolding 308 is thus located at these ends. In this example, the material web 30 is embedded into the surface of the walls 182, 184 as well. Apart from that, reference is made to the description above.

In the example of FIG. 2-E, the anchoring of the material web 30 in the walls 182, 184 is not formed by an edgefolding. Instead of an edgefolding, a deflecting section 312 is formed between the second section 304 and the third section 306 of the material web 30. The material web 304 abuts on the inner sides of the walls 182, 184 and is guided through the walls 182, 184 at the deflection section 312, wherein the third section 306 extend on the outer sides of the walls 182, 184 in the direction of the distal ends of the walls. An approximately S-shaped or Z-shaped or -shaped deflection of the material web is thus created, by means of which the material web is anchored in the walls 182, 184.

The examples of FIGS. 3-A to 3-E correspond substantially to the examples of FIGS. 2-A to 2-E, wherein the airbag flap 12 is made from one piece and U-shaped. The airbag flap 12 thus only has one hinge section 16 and one opposite predetermined breaking line 20. Similarly as in the previous figures, the hinge section 16 and the predetermined breaking line 20 is only shown in FIG. 3-A; however, they can also be provided in the examples of FIGS. 3-B to 3-E. The material web 30 extends along the inner side of the airbag flap 12, across the hinge section 16 and along the inner side or a part of the inner side of the wall 182. The material web 30 is anchored in the wall 182, as described with reference to FIGS. 2-A to 2-E, to which reference is made.

FIGS. 2A-2E and 3A-3E show sectional views through the airbag arrangement and illustrate how the material web extends across the airbag flap(s) and the one or the two side walls. In a direction perpendicular to the drawing plane, the material web can extend across the entire width of the chute 18 or only across a part of the width of the chute.

FIG. 4 shows a perspective view of a further example of an airbag arrangement; and FIG. 5 shows a sectional view through the airbag arrangement of FIG. 4 along line A-A. The view of FIG. 4 is a view into the chute of the airbag arrangement, quasi from the perspective of the airbag. The opposite walls 182, 184 can be seen, which, together with the opposite walls 186, 188, enclose the chute. The airbag flap 12 closes the chute and, in the example of FIGS. 4 and 5, is illustrated to include ribs 128 and recesses for stabilizing the airbag flap 12. In the example of FIG. 4, the material web 30 extends on the inner side of the chute wall 182 and along the inner side of the flap 12, wherein the reinforcing ribs 128 of the flap 12 are at least partially formed above the material web 30, so that the material web 30 is located between the main body of the flap 12 and the ribs 128, as can be best seen in FIG. 5. The hinge area 16 and the predetermined breaking line 20 can also be seen in FIG. 5. The material web 30 extends with its first section 302 across the inner side of the flap 12, across the hinge area 16, and with its second section 304 along the inner side of the wall 182. In FIG. 5, the edgefolding 308 inside the wall 182 as well as the third section 306 of the material web 30 can be seen as well.

Mold halves of an injection mold for manufacturing the airbag arrangement are schematically shown in FIG. 5 by means of the hatchings S1 and S2. To manufacture the arrangement shown in FIG. 5, the nozzle side or molding side of an injection molding tool can be located on the side of the flap 12 and the wall 182 facing away from the material web (in the hatching S1), so that the material web 30 is pushed against the opposite surface of the injection mold by means of the injected material, and is thus embedded in the corresponding surfaces of the flap 12 and of the wall 182. As illustrated in FIG. 5, the injected material inside the mold cavity, in which the wall 182 is formed, thereby penetrates between the sections 304 and 306 of the material web, on both sides of the edgefolding 308, so that the material web 30 comes to rest on the two opposite surfaces of the wall 182 and is anchored in the wall 182 by means of the injected material. In this case, the ejector side of the injection mold is located on the opposite side of the mold, which is suggested by the hatching S2. In contrast to the view of FIG. 5, the edgefolding 308 can be prefixed.

As suggested by the hatchings S1 and S2, a mold comprising a first mold shell and a second mold shell can thus be used to manufacture the airbag arrangement, the mold shells configured to integrally mold a flap, which closes a passage opening for an airbag, a hinge section along a side of the flap and a chute, which is connected to the flap via the hinge section. The material web is placed into the mold in such a way that a first part of the material web comes to rest on a first surface section of the mold, which is configured to form a surface of the flap facing the airbag, a second part of the material web comes to rest on a second surface section of the mold, which is configured to form an adjoining surface of the chute component, and a third part of the material web comes to rest on a third surface section of the mold, which is configured to form an opposite surface of the chute wall. After closing the mold, plastic material is introduced into the closed mold, e.g. injected, wherein the first, the second, and the third part of the material web are pushed against the first, the second and the third surface section.

The material web comprise a textile or a fabric, a knitted fabric, a film, a metal layer or a combination thereof, wherein the material web can further include natural and/or synthetic fibers. The material web can be expandable at least in a first direction, which extends perpendicular or approximately perpendicular to the hinge section.

What is claimed is:
1. An airbag arrangement comprising:
a flap component, which closes a passage opening for an airbag;
a hinge section along one side of the flap component;
a chute component, which is connected to the flap component via the hinge section; and
a material web, which is partially arranged in the flap component and partially in the chute component, and transverses the hinge section;
wherein the material web is molded into the chute component and is anchored in material of the chute component;
wherein the chute component forms at least one wall of an airbag chute, the wall having a length extending away from the flap component and terminating in a distal end;
wherein the material web includes a first part that forms a surface of said flap component and a second part that is arranged on an inner side of the wall from the hinge section for a first distance of the length of the wall, and the material web includes a third part arranged on an outer side of the wall for a second distance of the length of the wall, and wherein the material web penetrates the wall between the material web arranged on the inner side of the wall and the material web arranged on the outer side of the wall;
wherein the material web has a first side, a second side opposite the first side, and a thickness defined between the first side and the second side;
wherein the first side of the material web is arranged on the inner side of the wall, and the first side or the second side of the material web is arranged on the outer side of the wall;
wherein the material web has an edgefolding between said second and third part of said material web, which is embedded into the wall such that the material web abuts on the inner side of the wall on a first side of the edgefolding and the material web abuts on the outer side of the wall on a second side of the edgefolding
wherein said embedded edgefolding defines an acute angle between said second and third part of said material web.

2. The airbag arrangement according to claim 1, wherein the chute component forms a boundary wall, reinforcing wall, a guide wall or a positioning wall of the airbag chute.

3. The airbag arrangement according to claim 1, wherein the inner side of the wall faces the airbag chute, and the outer side of the wall faces away the airbag chute, and the material web is embedded into the wall such that the material web is partially arranged on the inner side of the wall and partially on the outer side of the wall.

4. The airbag arrangement according to claim 3, wherein the material web has an edgefolding and extends along the inner side of the wall to the edgefolding across a distance of at least 10 mm.

5. The airbag arrangement according to claim 1, wherein the two layers of the material web are connected to one another adjoining the edgefolding on the first side and the second side of the edgefolding.

6. The airbag arrangement according to claim 1, wherein the edgefolding is embedded into the wall at the distal end of the wall of the airbag chute or at a distance to the distal end of the wall of the airbag chute.

7. The airbag arrangement according to claim 1, wherein the first distance is at least 10 mm.

8. The airbag arrangement according to claim 1, wherein the at least one wall of the chute component further comprises a first wall of the airbag chute and an opposite second wall of the airbag chute, wherein the material web is embedded into the first wall and into the second wall.

9. The airbag arrangement according to claim 1, wherein the wall and the flap component enclose an angle of between 30° and 150°.

10. The airbag arrangement according to claim 1, wherein the material web is integrated into the flap component.

11. The airbag arrangement according to claim 1, wherein the flap component, the hinge section and the chute component are provided by an injection molded part.

12. The airbag arrangement according to claim 1, wherein the material web comprises a net, a fabric, a knitted fabric, a film, a metal layer or a combination thereof.

13. The airbag arrangement according to claim 1, wherein the material web is expandable at least in a first direction.

14. The airbag arrangement according to claim 1, wherein the airbag arrangement forms at least a portion of a motor vehicle trim part.

15. The airbag arrangement according to claim 1, wherein the first distance is at least 20 mm.

16. The airbag arrangement according to claim 1 wherein the material web arranged on said outer side of the wall for a second distance of length ends on said outer side of said wall.

17. A method for manufacturing an airbag arrangement, comprising:
providing a mold comprising a first mold shell and a second mold shell, which are configured to integrally form a flap component, which closes a passage opening for an airbag, a hinge section along a side of the flap component, and a chute component, which is connected to the flap component via the hinge section;
placing a material web into the mold having a first part which is configured to form a surface of the flap component, which faces the airbag, a second part which is configured to form an adjoining surface of the chute component which adjoins the surface of the flap component, and a third part which is configured to form an opposite surface of the chute component which is opposite the adjoining surface;
closing the mold;
introducing plastic material into the closed mold;
wherein the material web, placed into the mold, has an edgefolding between the second and the third part of the material web, into which the plastic material penetrates, wherein the penetrating plastic material pushes apart the second and the third part of the material web and against the opposite surfaces of the mold.

18. The method according to claim 17, wherein the edgefolding is preformed prior to placing the material web into the mold.

19. The method according to claim 17, wherein the flap component and the chute component are formed at an angle of between 30° and 150°.

20. The method according to claim 17, wherein the chute component forms a wall of an airbag chute and, at a distal end of the wall of the airbag chute or a distance to the distal end of the wall of the airbag chute, the edgefolding is positioned in and embedded into the wall.

* * * * *